United States Patent [19]

Ueno et al.

[11] Patent Number: 4,501,867

[45] Date of Patent: Feb. 26, 1985

[54] METHOD FOR PRODUCING A POLYBUTADIENE MATERIAL

[75] Inventors: Haruo Ueno, Chiba; Hidetomo Ashitaka, Ichihara; Koichi Nakajima, Chiba, all of Japan

[73] Assignee: Ube Industries, Ltd., Yamaguchi, Japan

[21] Appl. No.: 539,999

[22] Filed: Oct. 7, 1983

[30] Foreign Application Priority Data

Oct. 14, 1982 [JP] Japan .................................. 57-179150

[51] Int. Cl.³ ............................................. C08L 61/00
[52] U.S. Cl. ..................................... 526/136; 525/246; 525/247; 525/313; 526/92; 526/93; 526/94; 526/138; 526/140; 526/335
[58] Field of Search ................. 526/140, 335, 136, 92, 526/93, 94, 138

[56] References Cited

U.S. PATENT DOCUMENTS 3,448,095  6/1969  Dawans et al. .................. 526/335 X

FOREIGN PATENT DOCUMENTS 0034235  8/1981  European Pat. Off. ............ 526/335

Primary Examiner—Harry Wong, Jr.
Assistant Examiner—S. Babajko
Attorney, Agent, or Firm—Burgess, Ryan & Wayne

[57] ABSTRACT

A 1,2-polymerization of 1,3-butadiene is carried out in a polymerization solvent in the presence of a 1,2-polymerization catalyst consisting essentially of a cobalt compound soluble in the polymerization solvent, an organic aluminum halide, an organic magnesium compound, and carbon disulfide and/or phenyl isothiocyanate and in the presence or absence of a cis-1,4-polymerization product of 1,3-butadiene.

16 Claims, No Drawings

METHOD FOR PRODUCING A POLYBUTADIENE MATERIAL

BACKGROUND OF THE INVENTION

1. Field of the Invention

The present invention relates to a method for producing a polybutadiene material. More particularly, the present invention relates to a method for producing a polybutadiene material including a 1,2-polymerization step of 1,3-butadiene in the presence of a new type of 1,2-polymerization catalyst.

2. Description of the Prior Art

It is known that a syndiotactic 1,2-polybutadiene having a high melting point can be obtained by the polymerization of 1,3-butadiene in a polymerization solvent in the presence of a 1,2-polymerization catalyst consisting of a cobalt compound soluble in the polymerization solvent, a trialkyl aluminum, and carbon disulfide and/or phenyl isothiocyanate.

It is also known that a cis-1,4-polybutadiene can be produced by the polymerization of 1,3-butadiene in a polymerization solvent in the presence of a cis-1,4-polymerization catalyst consisting of a cobalt compound soluble in the polymerization solvent and an organic aluminum halide.

In Japanese Unexamined Patent Publication (Kokai) No. 56-88,410 (1981), it was disclosed for the first time that 1,2-polybutadiene can be produced by using an organic aluminum halide as a catalytic component of the 1,2-polymerization catalyst. That is, the Japanese publication (Kokai) discloses a process for producing 1,2-polybutadiene by polymerizing 1,3-butadiene in a polymerization solvent in the presence of a catalyst consisting of a cobalt compound soluble in the polymerization solvent, a dialkyl aluminum halide, carbon disulfide, and an electron donor organic compound.

However, a comparison of this type of polymerization process, wherein a cobalt compound-dialkyl aluminum halide-carbon disulfide-electron donor type catalyst is used, with the above-mentioned type of polymerization process, wherein a cobalt compound-trialkyl aluminum-carbon disulfide type catalyst is used, shows that the former process is more disadvantageous than the latter process in that the polymerization activity of the catalyst which corresponds to the yield of polybutadiene per unit time of polymerization and per unit amount of the cobalt compound is poor and/or the resultant 1,2-polybutadiene exhibits an unsatisfactorily low intrinsic viscosity $[\eta]$, determined in tetrahydronaphthalene at a temperature of 135° C., and, therefore, an unsatisfactorily small molecular weight.

Japanese Examined Patent Publication (Kokoku) No. 49-17666 discloses a process for producing a polybutadiene rubber having enhanced mechanical strength. In this process, a solution of 1,3-butadiene dissolved in an inert organic polymerization solvent is subjected to a cis-1,4-polymerization step in the presence of a cis-1,4-polymerization catalyst consisting of a cobalt compound and a halogenated organic aluminum compound of the formula $AlR_nX_{3-n}$, wherein R represents an alkyl radical having from 1 to 6 carbon atoms, a phenyl radical, or a cycloalkyl radical; X represents a halogen atom; and n represents the number of from 1.5 to 2, to convert at least a portion of 1,3-butadiene to cis-1,4-polybutadiene. Next, the resultant polymerization mixture, to which may or may not be added an additional amount of 1,3-butadiene and/or the inert organic solvent, is subjected to a 1,2-polymerization step in the presence of a 1,2-polymerization catalyst consisting of a cobalt compound, an organic aluminum compound of the formula $AlR_3$, wherein R is as defined above, and carbon disulfide to convert the remaining portion of 1,3-butadiene to 1,2-polybutadiene. In this type of process, the 1,2-polymerization catalyst contains the organic aluminum compound of the formula $AlR_3$ as a catalytic component.

SUMMARY OF THE INVENTION

An object of the present invention is to provide a method for producing a polybutadiene material containing 1,2-polybutadiene by using a 1,2-polymerization catalyst having an excellent catalytic activity.

Another object of the present invention is to provide a method for producing a polybutadiene material containing syndiotactic 1,2-polybutadiene having a high melting point and a high molecular weight at a high yield.

Still another object of the present invention is to provide a method for producing a polybutadiene material consisting of a boiling n-hexane-insoluble fraction and a boiling n-hexane-soluble fraction and having enhanced mechanical strength.

The above-mentioned objects can be attained by the method of the present invention which comprises the steps of: subjecting a solution containing 1,3-butadiene dissolved in a polymerization solvent to a 1,2-polymerization in the presence of a 1,2-polymerization catalyst consisting essentially of (A) a cobalt catalytic component consisting of at least one cobalt compound soluble in the polymerization solvent, (B) an aluminum catalytic component consisting of at least one organic aluminum halide, (C) a magnesium catalytic component consisting of at least one organic magnesium compound, and (D) a sulfur catalytic component consisting of at least one member selected from the group consisting of carbon disulfide and phenyl isothiocyanate; and isolating the resultant polybutadiene material from the 1,2-polymerization mixture.

The 1,2-polymerization procedure of 1,3-butadiene may be carried out in the presence of a cis-1,4-polymerization product of 1,3-butadiene dissolved in the polymerization solvent. The cis-1,4-polymerization product of 1,3-butadiene can be produced by subjecting a solution of 1,3-butadiene dissolved in a polymerization solvent to a cis-1,4-polymerization in the presence of a cis-1,4-polymerization catalyst consisting essentially of (E) a cobalt catalytic component consisting of at least one cobalt compound soluble in the polymerization solvent and (F) an aluminum catalytic component consisting of at least one organic aluminum halide. This cis-1,4-polymerization procedure is followed by the above-mentioned 1,2-polymerization procedure. The resultant polybutadiene material preferably consists of 5% to 30% by weight of a boiling n-hexane-insoluble fraction and 70% to 95% by weight of a boiling n-hexane-soluble fraction and exhibits enhanced mechanical strength.

DESCRIPTION OF THE PREFERRED EMBODIMENT

In the method of the present invention, a solution containing 1,3-butadiene dissolved in a polymerization solvent is subjected to a 1,2-polymerization procedure. The polymerization solvent is not limited to a specific type of liquid compound as long as the solvent is able to dissolve the polymerization product and is not reactive with the polymerization catalyst. Usually, the polymerization solvent consists essentially of at least one member selected from the group consisting of aromatic hydrocarbons having from 6 to 8 carbon atoms, for example, benzene, toluene, and xylene; aliphatic hydrocarbons having from 4 to 8 carbon atoms, for example, n-heptane and n-hexane; cycloaliphatic hydrocarbons having from 5 to 7 carbon atoms, for example, cyclohexane and cyclopentane; and halogenated hydrocarbons, for example, monochlorobenzene, o-dichlorobenzene, methylene chloride, 1,2-dichloroethane, and 1,1,2-trichloroethane.

It is preferable that the content of water in the 1,3-butadiene solution in the polymerization solvent be 50 mg/l (ppm) or less, more preferably, from 10 to 50 mg/l.

In the method of the present invention, the 1,3-butadiene solution is subjected to the 1,2-polymerization procedure in the presence of a specific 1,2-polymerization catalyst consisting essentially of (A) a cobalt catalytic component, (B) an aluminum catalytic component, (C) a magnesium catalytic component, and (D) a sulfur catalytic component. Also, in the method of the present invention, the 1,2-polymerization of 1,3-butadiene can be carried out in the presence of a cis-1,4-polymerization product of 1,3-butadiene dissolved in the polymerization solution. The cis-1,4-polymerization product of 1,3-butadiene can be prepared by subjecting a solution of 1,3-butadiene in a polymerization solvent, which may be the same as the polymerization solvent for the 1,2-polymerization procedure, to a cis-1,4-polymerization in the presence of a specific cis-1,4-polymerization catalyst consisting essentially of (E) a cobalt catalytic component and (F) an aluminum catalytic component.

Each of the cobalt catalytic components (A) and (E) consists of at least one cobalt compound, which is not limited to a specific type of compound as long as the cobalt compound is soluble in the polymerization solvent. Preferably, the cobalt compound is selected from the group consisting of cobalt-β-diketone complexes, cobalt-β-ketoacid ester complexes, cobalt salts of organic carboxylic acids having 6 or more carbon atoms, cobalt halide complexes, and cobalt complexes consisting of a cobalt atom coordinated with at least one member selected from olefins and diolefins.

The cobalt-β-diketone complexes are preferably of the formula:

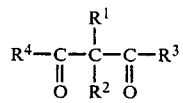

wherein $R^1$ and $R^2$ represent, independently from each other, a member selected from the group consisting of a hydrogen atom and aliphatic hydrocarbons having form 1 to 3 carbon atoms, respectively, and $R^3$ and $R^4$ represent, independently from each other, an aliphatic hydrocarbons having from 1 to 3 carbon atoms, respectively. Preferably examples of the cobalt-β-diketone complex are cobalt (II) acetylacetonate and cobalt (III) acetylacetonate.

The cobalt-β-ketoacid ester complexes are preferably of the formula:

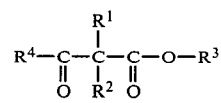

wherein $R^1$, $R^2$, $R^3$, and $R^4$ are defined above. A preferable example of the cobalt-β-ketoacid ester complex is cobalt acetacetic ethylester complex.

The cobalt salts of organic carboxylic acids usable for the present invention include cobalt octoacte, cobalt naphthenate, and cobalt benzoate.

The cobalt halide complexes are preferably of the formula: $CoX_l\,Y_m$ wherein X represents a halogen atom, preferably a chlorine atom, Y represents a ligand, l represents an integer of 2 or 3, and m represents an integer of from 1 to 4. The ligand Y useful for the cobalt halide complexes may be selected from amines, for example, pyridine, triethylamine, tributylamine, and dimethylaniline; aliphatic alcohols, for example, methyl alcohol and ethyl alcohol; and amides, for example, N,N-dimethylformamide, N,N-dimethyl acetamide, N,N-diethylformamide, N-methylpyrrolidone, pyrrolidone, and caprolactam. Preferably examples of the cobalt halide complexes are cobalt chloride-pyridine complex and cobalt chloride-ethyl alcohol complex.

The cobalt-olefin or diolefin complexes usable for the present invention include tris-$\pi$-allyl cobalt, bis-acrylonitrile-$\pi$-allyl cobalt, bis-$\pi$-1.5-cyclooctadiene-tert-butylisonitrile cobalt, $\pi$-cyclooctenyl-$\pi$-1.5-cyclooctadiene cobalt, $\pi$-1,3-cycloheptadienyl-$\pi$-1.5-cyclooctadiene cobalt, bi-cyclo [3,3,0]-octadienyl-1.5-cyclooctadiene cobalt, bis-($\pi$-allyl) halogen cobalt, wherein halogen may be chlorine, bromine, or iodine, bis-($\pi$-1.5-cyclooctadiene) ethyl cobalt, and (1,3-butadiene) [1-(2-methyl-3-butenyl)-$\pi$-allyl] cobalt.

Each of the aluminum catalytic components (B) and (F) consists of at least one organic aluminum halide of the formula: $AlR_nX_{3-n}$ wherein R represents a member selected from the group consisting of alkyl radicals having from 1 to 6 carbon atoms, aryl radicals having from 6 to 8 carbon atoms, and cycloalkyl radicals having from 5 to 7 carbon atoms, X represents a halogen atom, for example, chlorine or bromine atoms, and n represents the number of from 1 to 2. Preferable organic aluminum halides for the method of the present invention are diethyl aluminum monochloride, diethyl aluminum monobromide, diisobutyl aluminum monochloride, and ethyl aluminum sesquichloride.

The magnesium catalytic component (C) consists of at least one organic magnesium compound, preferably selected from dialkyl magnesium compounds wherein each alkyl group preferably has from 1 to 12 carbon atoms, more preferably, 2 to 6 carbon atoms, for example, ethylbutyl magnesium, di-n-butyl magnesium, and di-n-hexyl magnesium, which are available on the commercial market. A commercial dialkyl magnesium sometimes contains a small amount of triethyl aluminum which is effective for decreasing the degree of association of the dialkyl magnesium molecules. This type of commercial dialkyl magnesium is usable for the method of the present invention.

The sulfur catalytic component (D) consists of at least one member selected from carbon disulfide and phenyl isothiocyanate.

In the method of the present invention, it is essential that the 1,2-polymerization catalyst consist of all of the catalytic components (A), (B), (C), and (D). If the 1,2-polymerization catalyst contains no magnesium catalytic component (C), it is impossible to obtain a 1,2-polybutadiene material having a high melting point. This phenomenon will be illustrated in Comparative Example 1 hereinafter. Also, if the 1,2-polymerization catalyst contains no aluminum catalytic component (B), no 1,2-polybutadiene is obtained. This fact will be illustrated in Comparative Example 2 hereinafter.

In the specific 1,2-polymerization catalyst of the present invention, it is preferable that the cobalt catalytic component (A) be used in an amount of from 0.0005 molar % to 0.1 molar %, the aluminum catalytic component (B) in an amount of from 0.01 molar % to 1 molar %, the magnesium catalytic component (C) in an amount of from 0.01 molar % to 1 molar %, and the sulfur catalytic component (D) in an amount of from 0.001 molar % to 1 molar %, each based on the molar amount of 1,3-butadiene used.

In the specific 1,2-polymerization catalyst, it is also preferable that the aluminum catalytic component (B) be used in an amount of from 10 to 500 moles, more preferably from 20 to 200 moles, the magnesium catalytic component (C) in an amount of from 5 to 200 moles, more preferably from 10 to 100 moles, and the sulfur catalytic component (D) in an amount of from 0.1 to 500 moles, more preferably from 1 to 500 moles, each per mole of the cobalt catalytic component (A).

In the case where the aluminum catalytic component (B) consists of a compound of the formula $AlR_{1.5}X_{1.5}$, wherein R and X are as defined hereinbefore, for example, ethyl aluminum sesquichloride, the amount of the magnesium catalytic component (C) is preferably 0.5 moles or more per mole of the aluminum catalytic component (B).

It is also preferably that the amount of the magnesium catalytic component (C) be 1 mole or more per mole of water contained in the entire polymerization mixture, which water derives from the 1,3-butadiene solution in the polymerization solution, and be 1.5 times or less the sum of the molar amount of the water and the aluminum catalytic component (B).

There is no limitation in the sequence of adding the catalytic components into the 1,3-butadiene solution in the polymerization solvent. Usually, it is preferable that the sulfur catalytic component (D) be finally added to the 1,3-butadiene solution after other components (A), (B), and (C) are added. However, in the case where a cis-1,4-polymerization procedure is carried out prior to the 1,2-polymerization procedure, the sulfur catalytic component (D) may be added to the 1,3-butadiene solution before the cis-1,4-polymerization is started.

The magnesium catalytic component (C) may be used in the form of a solution thereof dissolved in a hydrocarbon solvent, for example, n-hexane or benzene and the solution may be directly added to the 1,3-butadiene solution or a resultant cis-1,4-polymerization mixture.

There is no restriction in the concentration of 1,3-butadiene in the 1,2-polymerization mixture. Usually, the concentration of 1,3-butadiene in the 1,2-polymerization mixture is preferably in the range of from 5% to 30%, based on the entire weight of the 1,2-polymerization mixture.

In the method of the present invention, the 1,2-polymerization procedure is carried out preferably at a temperature of from $-10°$ C. to 80° C., more preferably from 20° C. to 60° C., under a usual air atmospheric pressure or an increased pressure for from 0.1 to 5 hours. Usually, the 1,2-polybutadiene material produced in accordance with the present invention consists essentially of syndiotactic 1,2-polybutadiene and has a content of 1,2-structure of 90% or more, a melting point of from 200° C. to 220° C., and an intrinsic viscosity $[\eta]$ of from 1.2 to 8.0, preferably, from 2.0 to 8.0, determined in tetrahydronaphthalene at a temperature of 135° C. The 1,2-polybutadiene material is useful as a heat melt-bonding agent or a thermoplastic material.

In the case where the 1,2-polymerization procedure is carried out in the presence of a cis-1,4-polymerization product of 1,3-butadiene, it is preferable that the cis-1,4-polymerization product have a content of cis-1,4-structure of 90% or more, more preferably 95% or more, and an intrinsic viscosity $[\eta]$ of from 1.0 to 4.0, more preferably from 1.3 to 3.0. The cis-1,4-polymerization procedure should be carried out under conditions effective for producing a 1,2-polymerization product having the above-specified properties. In order to control the intrinsic viscosity of the cis-1,4-polymerization product to a desired value, the polymerization mixture may be added with a conventional molecular weight modifier consisting of, for example, a non-conjugated diene such as cyclooctadiene (COD) or allene, or an $\alpha$-olefin, for example, ethylene or propylene.

The cis-1,4-polymerization is preferably carried out at a temperature of from $-20°$ C. to 80° C., more preferably from 20° C. to 70° C., under a usual air atmospheric pressure or an increased pressure for from 10 minutes to 5 hours. The concentration of 1,3-butadiene in the cis-1,4-polymerization mixture is usually in the range of from 5% to 40% based on the entire weight of the polymerization mixture.

In the case where the cis-1,4-polymerization procedure is followed by the 1,2-polymerization procedure, the cis-1,4-polymerization mixture may contain the entire amount of 1,3-butadiene to be polymerized and the entire amount of the polymerization solvent to be used in both the cis-1,4-and 1,2-polymerization procedures. Otherwise, after the cis-1,4-polymerization procedure is completed, the resultant cis-1,4-polymerization mixture may be added with additional amounts of 1,3-butadiene and the polymerization solvent. In this case, the concentration of 1,3-butadiene in the 1,2-polymerization mixture is preferably in the range of from 3% to 40%.

The polymerization procedure of the present invention can be carried out in a batch type reactor in which a 1,2-polymerization step may follow a cis-1,4-polymerization step. Otherwise, the polymerization procedure of the present invention can be carried out in a continuous type reactor which may be provided with a cis-1,4-polymerization zone followed by a 1,2-polymerization zone. The above-mentioned two type of reactors can be utilized industrially.

When the 1,2-polymerization procedure of the present invention follows a cis-1,4-polymerization of 1,3-butadiene, the 1,2-polymerization procedure is preferably carried out under conditions which result in production of a polybutadiene material consisting of from 5% to 30% by weight of a boiling n-hexane-insoluble fraction and from 70% to 95% by weight of a boiling n-hexane-soluble fraction thereof.

When the 1,2-polymerization reaction reaches a desired degree thereof, the polymerization reaction is shortstopped by adding a large amount of a shortstopper consisting of, for example, water or an aliphatic alcohol which is capable of reacting with the aluminum catalytic component (B) so as to deactivate the catalyst, into the resultant 1,2-polymerization mixture; by admixing the resultant 1,2-polymerization mixture into a large amount of a polar solvent, for example, water, methyl alcohol or isopropyl alcohol; by adding a small amount of the polar solvent containing an inorganic acid, for example, hydrochloric acid or sulfuric acid, an organic acid, for example, acetic acid or benzoic acid, monoethanolamine, or ammonia to the resultant 1,2-polymerization mixture; or by introducing hydrogen chloride gas into the resultant 1,2-polymerization mixture.

The above-mentioned shortstopper or polar solvent usually contains a stabilizer consisting of, for example, 2,6-di-tert-butyl-4-methyl phenol and/or 2,2'-methylene-bis(4-methyl-6-tert-butyl phenol).

Then, the resultant polymer material is isolated from the resultant 1,2-polymerization mixture by mixing a precipitating agent, for example, methyl alcohol, to the resultant 1,2-polymerization mixture or by evaporating away a volatile substance including the polymerization solvent from the resultant polymerization mixture, so as to cause the resultant polymer material to precipitate from the resultant polymerization mixture. In the latter manner, steam may be blown into the resultant polymerization mixture. The precipitated polymer material is separated from the polymerization mixture and dried.

When the resultant polybutadiene material consists of from 5% to 30% by weight of a boiling n-hexane-insoluble fraction and from 70% to 95% by weight of a boiling n-hexane-soluble fraction, the boiling n-hexane-insoluble fraction preferably has an intrinsic viscosity of from 1.2 to 8 determined in tetrahydronaphthalene at 135° C., a content of 1,2-structure of 85% or more, and a melting point of from 200° C. to 220° C. The boiling n-hexane-soluble fraction preferably has an intrinsic viscosity of from 1 to 5 determined in toluene at 30° C. and a content of cis-1,4-structure of 92% or more. In the boiling n-hexane-insoluble fraction, a portion having the 1,2-structure consists essentially of syndiotactic 1,2-polybutadiene.

The polymerization product produced in accordance with the method of the present invention may be blended with conventional additives which are usable for natural rubber, conventional synthetic rubbers, for example, a high cis-1,4-polybutadiene rubber, and other synthetic polymer materials.

The polymerization product prepared in accordance with the method of the present invention may also be blended with a natural rubber and/or another synthetic rubber or polymer material.

SPECIFIC EXAMPLES

The present invention will be further explained in the following examples.

In the examples, the amount of the boiling n-hexane-insoluble fraction of the resultant polybutadiene material was determined by immersing 2 g of the polybutadiene material in 200 ml of n-hexane at room temperature, by separating a fraction of the rubber insoluble in n-hexane by means of filtration, by extracting the n-hexane-insoluble fraction at a boiling point of n-hexane by using a Soxhlet's extractor for 4 hours, by separating the nonextracted fraction from n-hexane, by drying it under vacuum, and, finally, measuring the weight of the dried fraction.

The amount of the boiling n-hexane-soluble fraction of the polybutadiene material was determined by subjecting the resultant extracted solution from the above-mentioned extraction procedure to an evaporation procedure in which n-hexane was evaporated from the solution, drying the residual fraction under vacuum, then measuring the weight of the dried fraction.

The content of the cis-1,4-structure in the cis-1,4-polymerization product or in the boiling n-hexane-soluble fraction in the polybutadiene material was determined by means of infrared absorption spectrum analysis (IR).

The content of the 1,2-structure in the 1,2-polymerization product or in the boiling n-hexane-insoluble fraction of the polybutadiene material was determined by means of nuclear magnetic resonance spectrum (NMR).

The melting points of the 1,2-polymerization product and the boiling n-hexane-insoluble fraction of the polybutadiene material were determined from a temperature at a peak point appearing in an endothermic curve of the tested material by a recording differential scanning calorimeter (DSC).

The intrinsic viscosities $[\eta]$ of the boiling n-hexane-soluble fraction of the polybutadiene material and of the cis-1,4-polymerization product was determined in toluene at a temperature of 30° C.

The intrinsic viscosities $[\eta]$ of the 1,2-polymerization product and the boiling n-hexane-insoluble fraction of the polybutadiene material were determined in tetrahydronaphthalene at a temperature of 135° C.

EXAMPLE 1

A solution of 85 g of dry 1,3-butadiene dissolved in 860 ml of anhydrous benzene, which solution contained 1.0 millimoles of water, was charged into a separable flask, which flask had a capacity of 2 liters, was equipped with a thermometer, a stirrer, and an inlet for introducing nitrogen gas thereinto, and was filled with nitrogen gas.

While the temperature of the 1,3-butadiene solution was maintained at 40° C. and the solution was stirred by the stirrer, 4.6 millimoles of cyclooctadiene, 4.0 millimoles of diethyl aluminum monochloride, and then 0.043 millimoles of cobalt octoate were added to the 1,3-butadiene solution in the above-mentioned sequence to provide a cis-1,4-polymerization mixture. Thereafter, the mixture was subjected to a cis-1,4-polymerization by stirring it at a temperature of 40° C. for 12 minutes.

The resultant cis-1,4-polymerization product had a content of cis-1,4-structure of 96% or more and an intrinsic viscosity of 2.4.

The resultant cis-1,4-polymerization mixture, containing 31 g of non-reacted 1,3-butadiene was admixed with 1.5 millimoles of ethylbutyl magnesium and 0.13 millimoles of carbon disulfide to provide a 1,2-polymerization mixture.

The 1,2-polymerization mixture was stirred at a temperature of 40° C. for 16 minutes. Thereafter, the 1,2-polymerization mixture was mixed with 1 liter of methyl alcohol containing small amounts of 2,6-di-tert-butyl-4-methyl phenol and hydrochloric acid to shortstop the polymerization reaction and to allow the resultant polybutadiene material to precipitate. The precipitated polybutadiene material was collected by means of filtration and dried at a temperature of approximately 20° C. under a reduced pressure. A polybutadiene material was isolated in an amount of 60.8 g.

The polybutadiene material consisted of 11.7% by weight of a boiling n-hexane-insoluble fraction having a content of 1,2-structure of 92.5%, a melting point of 205° C., and an intrinsic viscosity of 4.1 and 88.3% by weight of a boiling n-hexane-soluble fraction having a content of cis-1,4-structure of 96.5% and an intrinsic viscosity of 2.2.

EXAMPLE 2

The same procedures as those described in Example 1 were carried out, except that the cobalt octoate was used in an amount of 0.03 millimoles, the cis-1,4-polymerization time was 40 minutes, and the 1,2-polymerization time was 17 minutes. The resultant polybutadiene material was in a yield of 64.0 g and consisted of 10% by weight of a boiling n-hexane-insoluble fraction having a content of 1,2-structure of 93.4%, a melting point of 205° C., and an intrinsic viscosity of 3.8 and 90% by weight of a boiling n-hexane-soluble fraction having a content of cis-1,4-structure of 97.5% and an intrinsic viscosity of 2.1.

EXAMPLE 3

The same procedures as those described in Example 1 were carried out except that ethylbutyl magnesium was replaced by 7.5 dibutyl magnesium-triethyl aluminum (7.5 $Bu_2Mg.AlEt_3$) in an amount of 1.2 millimoles in terms of magnesium.

The resultant polybutadiene material was in a yield of 61.1 g and consisted of 13.9% by weight of a boiling n-hexane-insoluble fraction having a content of 1,2-structure of 92.9%, a melting point of 205° C., and an intrinsic viscosity of 5.8 and 86.1% by weight of a boiling n-hexane-soluble fraction having a content of cis-1,4-structure of 96.2% and an intrinsic viscosity of 2.3.

EXAMPLE 4

The same flask as that mentioned in Example 1 was charged with 1 liter of a solution containing 85 g of 1,3 butadiene dissolved in benzene and 1.5 millimoles of water. While the temperature of the solution was maintained at about 40° C. the solution was admixed with 4 millimoles of diethyl aluminum monochloride, 1.5 millimoles, in term of magnesium, of 7.5 $Bu_2Mg.AlEt_3$, 0.043 millimoles of cobalt octoate, and, then, 0.13 millimoles of carbon disulfide in the above-mentioned sequence to provide a 1,2-polymerization mixture. This polymerization mixture was stirred at a temperature of 40° C. for 30 minutes. The resultant polymerization mixture was treated in the same manner as that described in Example 1.

The yield and properties of the resultant 1,2-polybutadiene material are indicated in Table 1.

It was confirmed by means of X-ray analysis and a differential scanning calorimeter (DSC) that the resultant 1,2-polybutadiene material consisted essentially of a highly crystalline syndiotactic 1,2-polybutadiene.

EXAMPLE 5

The same procedures as those described in Example 4 were carried out, except that the 1,3-butadiene solution was admixed with 4 millimoles of diethyl aluminum monochloride, 1.5 millimoles of ethylbutyl magnesium, 0.13 millimoles of carbon disulfide, and, finally, 0.043 moles of cobalt octoate in the above-mentioned sequence.

The yield and properties of the resultant polymer are shown in Table 1.

EXAMPLE 6

The same procedures as those described in Example 4 were carried out, except that the 1,3-butadiene solution was admixed with 1.5 millimoles of ethylbutyl magnesium, 4 millimoles of diethyl aluminum monochloride, 0.043 millimoles of cobalt octoate, and, finally, 0.12 millimoles of carbon disulfide in the above-described sequence.

The yield and properties of the resultant polymer are indicated in Table 1.

EXAMPLE 7

The same procedures as those described in Example 6 were carried out, except that the content of water in the 1,3-butadiene solution in benzene was 0.1 millimole and the amount of carbon disulfide was 0.13 millimoles.

The yield and properties of the resultant polymer are indicated in Table 1.

EXAMPLE 8

The same procedures as those described in Example 7 were carried out, except that carbon disulfide was replaced by phenol isothiocyanate in an amount of 2 millimoles.

The yield and properties of the resultant 1,2-polybutadiene material are shown in Table 1.

TABLE 1

| Example No. | 1,2-polybutadiene material | | | |
|---|---|---|---|---|
| | Yield (g) | Melting point (°C.) | Intrinsic viscosity ($\eta$) | Content of 1,2-structure (%) |
| 4 | 22.4 | 207 | 7.1 | >95 |
| 5 | 9.2 | 205 | 4.0 | >95 |
| 6 | 12.7 | 205 | 4.2 | >95 |
| 7 | 14.0 | 205 | 4.5 | >95 |
| 8 | 6.0 | 205 | 3.1 | >95 |

COMPARATIVE EXAMPLE 1

The same procedures as those described in Example 4 were carried out, except that no ethylbutyl magnesium was used.

The resultant polymer was 77 g of cis-1,4-polybutadiene having a content of cis-1,4-structure of 97.8%.

COMPARATIVE EXAMPLE 2

The same procedures as those described in Example 6 were carried out, except that no diethyl aluminum monochloride was used and the 1,3-butadiene solution contained 0.05 millimole/l of water.

No polymer was obtained.

EXAMPLE 9

The polybutadiene rubber produced in Example 6 was converted into a composition as indicated in Table 2.

TABLE 2

| Component | Amount (part by weight) |
|---|---|
| Polybutadiene rubber | 100 |
| HAF Carbon (*) | 50 |
| Naphthene type process oil | 10 |
| Zinc oxide | 5 |
| Stearic acid | 2 |
| Amine type antioxidant | 1 |
| Cyclohexyl-benxothiazyl sulfenamide | 1 |
| Sulfur | 1.5 |

Note:
(*) -Oil absorption: 80 g per 100 g of the carbon
Surface area: 85 $m^2$ per g of the carbon particles The composition was uniformly mixed by using a Brabender plastograph having a capacity of 60 ml and, then, by using a roll mixer, and vulcanized at a temperature of 140° C. for 30 minutes. The vulcanizing procedure was applied to a portion of the composition which was subjected to the measurement of a flex-crack resistance of the vulcanized composition, at 140° C. for 75 minutes. The properties of the vulcanized composition was determined in accordance with Japanese Industrial Standard K-6301.

For the purpose of comparison, the same procedures as those mentioned above were carried out, except that the polybutadiene rubber was replaced by a commercially available high cis-1,4-polybutadiene.

The properties of the vulcanized composition of the present example and the comparative vulcanized composition are indicated in Table 3.

TABLE 3

| Item | Example 9 | Comparative Composition |
|---|---|---|
| Hardness | 69 | 58 |
| 300% modulus (kg/cm$^2$) | 143 | 80 |
| Ultimate elongation (%) | 421 | 540 |
| Tensile strength (kg/cm$^2$) | 187 | 194 |
| Tear strength (kg/cm$^2$) (*)$_1$ | 58 | 48 |
| Flex-crack resistance (*)$_2$ | >300,000 | 3,000 |

Note:
(*)$_1$ The tear strength was measured in accordance with B-type test method described in JIS K-6301.
(*)$_2$ The flex-crack resistance was represented by the number of flexing operations at which the length of a crack created in a testing specimen reached from 2 mm to 15 mm.

We claim:

1. A method for producing a polybutadiene material, comprising the steps of:
subjecting a solution containing 1,3-butadiene dissolved in a polymerization solvent to a 1,2-polymerization in the presence of a 1,2-polymerization catalyst consisting essentially of (A) a cobalt catalytic component consisting of at least one cobalt compound soluble in the polymerization solvent, (B) an aluminum catalytic component consisting of at least one organic aluminum halide, (C) a magnesium catalytic component consisting of at least one organic magnesium compound, and (D) a sulfur catalytic component consisting of at least one member selected from the group consisting of carbon disulfide and phenyl isothiocyanate; and isolating the resultant polybutadiene material from the 1,2-polymerization mixture.

2. The method as claimed in claim 1, wherein said polymerization solvent consists essentially of at least one member selected from the group consisting of aromatic hydrocarbons, aliphatic hydrocarbons, cycloaliphatic hydrocarbons, and halogenated hydrocarbons which are capable of dissolving the resultant polybutadiene material.

3. The method as claimed in claim 1, wherein said polymerization solvent contains water in an amount of 50 mg/l or less.

4. The method as claimed in claim 1, wherein said cobalt compound is selected from the group consisting of cobalt-β-diketone complexes, cobalt-β-ketoacid ester complexes, cobalt salts of organic carboxylic acids having 6 or more carbon atoms, cobalt halide complexes and cobalt complexes consisting of a cobalt atom coordinated with a member selected from olefins and diolefins.

5. The method as claimed in claim 1, wherein said organic aluminum halide is of the formula (I):

$$AlR_nX_{3-n} \tag{I}$$

wherein R represents a member selected from the group consisting of alkyl radicals having from 1 to 6 carbon atoms, aryl radicals having from 6 to 8 carbon atoms and cycloalkyl radicals having from 5 to 7 carbon atoms, X represents a halogen atom and n represents the number of from 1 to 2.

6. The method as claimed in claim 1, wherein said organic magnesium compound is selected from dialkyl magnesium wherein each alkyl group has from 1 to 12 carbon atoms.

7. The method as claimed in claim 1, wherein said cobalt catalytic component (A) is used in an amount of from 0.005 molar % to 0.1 molar % based on the molar amount of 1,3-butadiene used.

8. The method as claimed in claim 1, wherein said aluminum catalytic component (B) is used in an amount of from 0.01 molar % to 1 molar % based on the molar amount of 1,3-butadiene used.

9. The method as claimed in claim 1, wherein said magnesium catalytic component (C) is used in an amount of from 0.01 molar % to 1 molar % based on the molar amount of 1,3-butadiene used.

10. The method as claimed in claim 1, wherein said sulfur catalytic component (D) is used in an amount of from 0.001 molar % to 1 molar % based on the molar amount of 1,3-butadiene used.

11. The method as claimed in claim 1, wherein said aluminum catalytic component (B) is used in an amount of from 10 to 500 moles per mole of said cobalt catalytic component (A).

12. The method as claimed in claim 1, wherein said magnesium catalytic component (C) is used in an amount of from 5 to 200 moles per mole of said cobalt catalytic component (A).

13. The method as claimed in claim 1, wherein said sulfur catalytic component (D) is used in an amount of from 0.1 to 500 moles per mole of said cobalt catalytic component (A).

14. The method as claimed in claim 1, wherein 1,3-butadiene in said polymerization mixture is in a concentration of from 5% to 30% based on the entire weight of said polymerization mixture.

15. The method as claimed in claim 1, wherein said polymerization step is carried out at a temperature of from −10° C. to 80° C.

16. The method as claimed in claim 1, wherein the resultant polymerization product comprises syndiotactic 1,2-polybutadiene and has a content of 1,2-structure of 90% or more, a melting point of from 200° C. to 220° C., and an intrinsic viscosity [η] of from 1.2 to 8 as determined in tetrahydroxynaphthalene at a temperature of 135° C.

* * * * *